April 30, 1940.   H. SHWOM ET AL   2,198,726
METHOD OF MAKING DIP COATED JELLY CONTAINING FOOD PRODUCTS
Filed Feb. 17, 1939
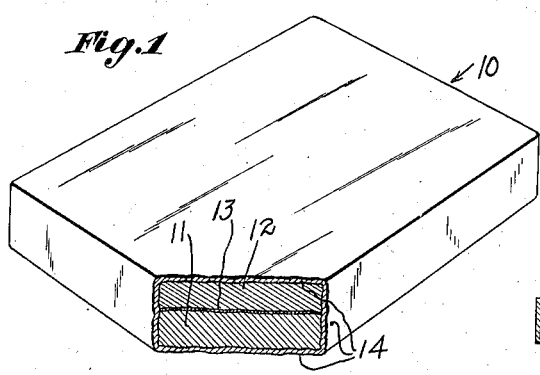
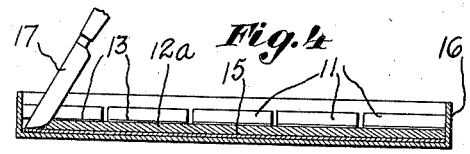
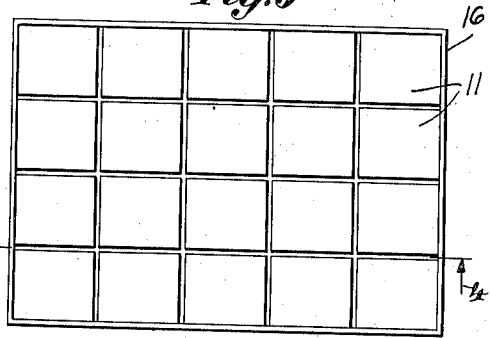
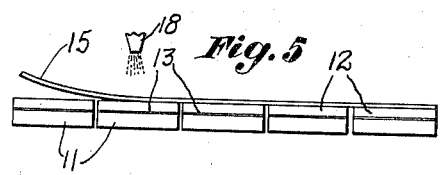
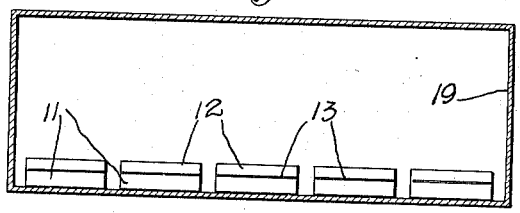
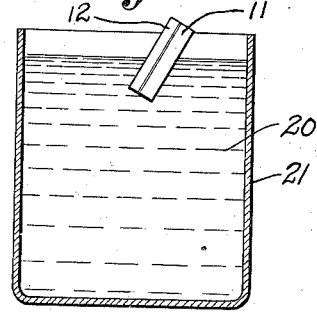
Hyman Shwom and Edward Shwom INVENTORS
BY Gus Shumacher ATTORNEY.

Patented Apr. 30, 1940

2,198,726

UNITED STATES PATENT OFFICE 2,198,726

METHOD OF MAKING DIP COATED JELLY CONTAINING FOOD PRODUCTS

Hyman Shwom and Edward Shwom, Brooklyn, N. Y.

Application February 17, 1939, Serial No. 256,850

8 Claims. (Cl. 99—138)

This invention relates to dip coated jelly containing food products and to methods of making the same.

One object of the invention is the provision of a novel food product containing jelly in relatively soft condition, and having a very thin dip-formed coating in contact with the jelly, the food product having a relatively long life and being free of discoloration and other undesired effects, with the coating forming an air seal for the jelly.

A related object of the invention is to provide such a food product wherein the coating consists of chocolate and is relatively light in weight for its size, due to the thinness of the coating,—a condition attainable only by dipping; and cracking and discoloration of the chocolate by the jelly being avoided, although the jelly is quite soft to maintain its high degree of palatability.

Another object of the invention is the provision of an improved method for making on a quantity production basis the food product mentioned, so that the stickiness of the jelly shall not interfere with the handling thereof nor the fluidity of the jelly interfere with the dip coating operation.

Heretofore it has never to our knowledge been known to produce an article of the nature herein set forth, nor was any method known by which a skilled confectioner could produce the article so as to afford the advantages herein noted. For example, it was believed that a dipped chocolate coating could not be formed on jelly, and that even if it were formed, it would crack and discolor under the influence of the liquid in the jelly. Nor could the problem be solved by a molding, instead of a dipping operation, because the chocolate coating would then be so thick as to unduly increase the weight of food products sold by the pound. If a biscuit, cracker or other porous light weight edible were incorporated, as a base for the jelly, it would be assumed in the art that the cracker would become moist and soggy, nor was there any apparent method known to overcome this. Finally, the manual handling of the jelly, which is highly tacky, represented a problem for which there appeared to be no solution for a large scale production basis.

It is therefore a further object of the invention to overcome the difficulties above mentioned and to provide a novel confectionery article or food product, such as a cracker, having as a base a cracker on which is superposed a layer of relatively soft palatable jelly, the latter and the jelly coated completely with a very thin layer of chocolate, which will not crack or discolor, the crispness of the cracker being maintained and the product being relatively light in weight.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view of an article embodying the invention with a part removed and in section to show the construction thereof.

Fig. 2 is a view in vertical section on a reduced scale of a device for practising the first step of the method.

Fig. 3 is a top plan view of a lay out according to a succeeding step of the method.

Fig. 4 is a sectional view on the line 4—4 of Fig. 3, but with a jelly separating blade in position.

Fig. 5 is a view in elevation showing the next step of the method, whereby the individual partly formed articles are separated.

Fig. 6 illustrates a further step of the method, with the partly formed articles in a drying chamber, shown in section.

Fig. 7 is a vertical sectional view of a chocolate filled tank as used in the final dipping operation.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes an article of confectionery or a food product, such as a cracker, embodying the invention. The same may include a base 11, and superposed thereon is a layer of jelly 12. Intermediate of these layers is a film 13 of moisture resisting material such as chocolate. Completely enclosing and air sealing the above parts is a continuous layer of very thin dipped chocolate 14.

The base 11 is an edible material having sufficient strength to serve as a structural support for the jelly 12 and to afford a desired body to the article 10. By way of illustration, the base 11 may consist of a biscuit or cracker or doughy baked member which may be highly porous so as to be light in weight and to afford a desired crispness.

The jelly 12 may consist of any suitable edible material. For instance, it may be any usual fruit jelly. While relatively firm in consistency, so that it will not freely run and soil the person who is eating the article, the jelly is free of any suggestion of hardness as would be the case with jelly which has been overcooked, and hence has lost the characteristic palatability of jelly. Differently stated, the jelly 12 has a substantial moisture content as distinguished from overcooked jelly in which the moisture content is relatively low, causing it to have a peculiar dryness.

The intermediate layer 13 consists of any suitable edible moisture resistant material which is adapted to be applied as a very thin coating to the cracker 11. By way of illustration, and not in a limiting sense, we prefer to employ chocolate. In order to save space, this layer 13 may be a relatively thin film, say about one sixty-fourth to one thirty-second of an inch in thickness. It serves to prevent moisture in the jelly from being absorbed by the cracker 11 to render the same soggy. By the use of this layer 13, the crispness of the cracker 11 is maintained in a high degree, and conversely the moisture content of the jelly is kept at a desired standard.

It will be noted that while the moisture content of jelly causes a thin chocolate coating to crack, this will not occur with the layer 13, because the same is bonded throughout to a porous surface of the cracker 11.

The coating 14 may consist of any suitable edible material that is adapted to be applied by a dipping operation. Desirably it is also moisture resistant and is adapted to form an air sealed enclosure whereby the jelly is prevented from drying out. Chocolate is an ideal material for this purpose. Since chocolate contains cocoa butter, which tends to partially separate to cause discoloration of the chocolate when in lengthy contact with moisture, it is important to prevent the moisture of the jelly from causing this result.

We have discovered that if the consistency of the jelly 13 is such as results after lengthy drying of otherwise normal jelly, its moisture content is apparently reduced, or probably it forms a skin along its exposed surface, so that the chocolate will not merely run off from the jelly upon dipping, but will adhere thereto, and so that the discoloration of the chocolate is avoided, and cracking of the chocolate is prevented, so that the product 10 has a relatively long life.

We will now describe the method of making our chocolate dipped jelly containing article 10. A sheet of absorbent fabric such as paper 15 is placed in a pan 16 so as to fully cover its bottom. Now a quantity of jelly of a relatively freely flowing consistency is poured into the pan 15 to form the layer 12a overlying the paper 15. It may be noted that if the jelly were overcooked or unduly dry, manipulation of the jelly would be difficult.

Now individual biscuits or crackers such as 11 are coated on one side with a film of moisture resistant material such as chocolate to form the layer 13. The latter may be deposited by suitably dipping the cracker 11 is a chocolate bath of relatively low viscosity, which may be less than that used in forming the coating 14. When the coating 13 has dried, the crackers 11 are placed on the jelly layer 12a, with the coating 13 in contact with the jelly. The latter has in the meantime been permitted to cool from its pouring temperature of 100 degrees F. to about room temperature, and has lost some of its moisture by absorption by the paper 15.

Now, as indicated in Fig. 4, a knife or blade 17, which may be equal in thickness to the spacing between the crackers 11, is run between the latter to cut and separate the jelly layer 12a into sections as at 12, of the same size as the cracker 11. In this condition, the materials are generally permitted to stand for several hours so that the marginal portions of the jelly layers 12 lose some of their moisture by drying.

The step illustrated in Fig. 5 is now practiced, the paper sheet 15 being first dampened as by a sponge or by a fine spray nozzle 18, to permit easy removal of paper, the materials having been first removed from the pan 16 and inverted as shown. By dampening the paper, the removal thereof is facilitated, but the moisture added thereto is intended to be insufficient to affect the moisture content of the jelly.

We now perform the principal drying operation for the jelly, by permitting the materials to stand for approximately 24 to 36 hours at about 80 to 90 degrees F., in a reasonably dry atmosphere, or at least in one which is not humid. If the atmosphere is humid, the materials are placed in a warm drying chamber 19 as shown in Fig. 6. In either case, the drying to which the jelly layer 12 is subjected appears to cause the formation of a skin on the exposed surface thereof.

The materials are now ready for the dipping operation, which may be performed in any suitable manner, as by dipping in a bath of liquid chocolate 20 in a vat 21. This dipping is accomplished at about 80 to 85 degrees F., to maintain a high fluidity of the chocolate, and to permit excess chocolate to easily flow off. It is important that the chocolate be not heated to higher temperature, to avoid separation of the cocoa butter therein. Should the atmosphere during dipping be excessively humid, it may be desirable to sprinkle some powdered chocolate or the like over the jelly.

The foregoing process results in a product 10 having all the qualifications above noted and being light in weight, as there is a minimum amount of relatively heavy chocolate used. Hence when this product is bought by the pound, a sufficiently large number of the crackers 10 is obtained to make this product a suitable commercial article.

By way of illustration, we may use a jelly made of 50 pounds of water, 1 pound of agar agar, 37 pounds of sugar and 12 pounds of glucose. With the water relatively cold, the agar agar is soaked therein for 15 to 20 minutes, while slowly heating to a boil during that time. When it is perceived that the agar agar has fully dissolved, the sugar is added. Then the mixture is boiled for 15 to 20 minutes and finally the glucose is added.

Normally cooked jelly, treated and kept in any suitable manner, usually consists of 45 to 55% of water. With our process, the water content of the jelly is reduced to about 20 to 35 percent, so that there is a substantial reduction in water as compared with any other normally cooked jelly. It will be understood that the figures herein mentioned are merely illustrative. Thus the preliminary air drying of the jelly may vary from 1½ to 4 hours; and the final air drying may vary from 18 to 48 hours and its temperature may be between 75 and 95 degrees F.

Further it may be noted that the film 13 may be a moisture absorbent material such as sugar instead of a moisture resistant material though these terms may be interchangeably used to indicate that the moisture of the jelly will not enter the wafer to render the flour dough of the latter moist, with loss of its crispness.

We claim:

1. The herein described method, including placing a layer of normally cooked jelly on a sheet of pliable material, disposing preformed edible wafers on said layer in spaced relation to each other, cutting through the jelly layer between the wafers to separate the jelly layer into sections to form units with the individual wafers, inverting the sheet and stripping it off from the jelly sections, air drying the jelly, and then dipping the units in chocolate to encase the same.

2. The herein described method, including placing a layer of normally cooked fruit jelly on a sheet of moisture absorbent pliable material, disposing preformed edible wafers on said layer in spaced relation to each other, cutting through the jelly layer between the wafers to separate the jelly layer into sections forming units with the individual wafers, air drying the jelly for two to four hours, inverting said sheet, dampening said sheet and stripping it off from the jelly, then air drying the jelly for 36 to 48 hours at a temperature between 80 and 90 degrees F., then coating the units by dipping the same in a chocolate bath.

3. The herein described method, including placing a layer of normally cooked fruit jelly on a sheet of moisture absorbent pliable material, disposing preformed edible wafers on said layer in spaced relation to each other, cutting through the jelly layer between the wafers to separate the jelly layer into sections forming units with the individual wafers, inverting said sheet with the units thereon, dampening said sheet and stripping the same off from the jelly, then air drying the jelly to substantially reduce the moisture content thereof, and finally coating the units by dipping in a chocolate bath.

4. The herein described method including disposing a layer of normally cooked jelly on a sheet of pliable material, forming a film of moisture resistant material on a face of each of a plurality of preformed edible crisp-like wafers, placing said wafers on the jelly layer with said film in contact with the latter, cutting through the jelly between the wafers to form jelly sections which provide units with the individual wafers, inverting said sheet with the units thereon, stripping the sheet from the jelly, drying the jelly to cause it to lose a substantial part of its moisture, and finally coating said units by dipping in a chocolate bath.

5. The herein described method including disposing a layer of normally cooked jelly on a sheet of pliable moisture absorbent material, forming a film of moisture resistant material on a face of each of a plurality of crisp-like wafers, placing said wafers in spaced relation to each other on the jelly layer with said film in contact with the jelly, cutting through the jelly layer between the wafers to provide jelly sections forming units with the individual wafers, subjecting the jelly to a preliminary air drying operation for 2 to 4 hours, inverting said sheet with the units thereon, dampening said sheet, and stripping it off from the jelly, air drying the jelly to cause it to lose a substantial part of its moisture content, and finally coating the units by dipping them in a chocolate bath.

6. The herein described method including placing a layer of normally cooked jelly on a baked wafer formed of a dough-like material, drying the jelly to cause it to lose a substantial part of its moisture content, and coating by dipping the wafer and its jelly layer in a bath of chocolate.

7. The herein described method including placing a layer of normally cooked jelly on an edible wafer, air drying the jelly at 80 to 90 degrees F. for 24 to 48 hours, and coating the wafer and its jelly by dipping in a bath of chocolate.

8. The herein described method, including forming a film of relatively moisture resistant chocolate on a surface of a porous crisp wafer baked of flour dough, placing a layer of normally cooked fruit jelly on said film, drying the jelly to cause it to lose a substantial part of its water content, and coating by dipping the wafer and its jelly in chocolate.

EDWARD SHWOM.
HYMAN SHWOM.